Oct. 3, 1967   F. LOBASH ETAL   3,344,772
SPRAY COATER

Filed April 1, 1963   7 Sheets-Sheet 1

FIG. 1

INVENTORS
FLOYD LOBASH
ALEXANDER J. GILCHRIST
MELVIN J. STRAUB

By Moore, White & Durel
ATTORNEYS

Oct. 3, 1967   F. LOBASH ETAL   3,344,772
SPRAY COATER
Filed April 1, 1963   7 Sheets-Sheet 5

INVENTORS
FLOYD LOBASH
ALEXANDER J. GILCHRIST
MELVIN J. STRAUB
By Moore, White & Burd
ATTORNEYS

INVENTORS
FLOYD LOBASH
ALEXANDER J. GILCHRIST
MELVIN J. STRAUB
By Moore, White & Burd
ATTORNEYS

United States Patent Office 3,344,772
Patented Oct. 3, 1967

3,344,772
SPRAY COATER
Floyd Lobash and Alexander J. Gilchrist, Minneapolis, and Melvin J. Straub, Hopkins, Minn., assignors to Possis Machine Corporation, Minneapolis, Minn., a corporation of Minnesota
Filed Apr. 1, 1963, Ser. No. 269,395
15 Claims. (Cl. 118—301)

This invention is a machine for depositing on a heated object resin powder such as epoxy that melts and fuses upon contact with a heated surface to form a coating thereover. The machine is novel in having structure to apply the resin only where desired and avoid applying it where it is not desired. It is specifically novel in providing a combination of spraying and vacuum withdrawing excess particles together with mechanical masking of certain areas and deflection vanes and the like to apply the powder only to desired surfaces of a heated object. Also novel are an expanding mandrel, which for some uses may be cooled, and in the alternative a dual roller arrangement for moving cylindrical objects past the spray nozzles for coating. The hollow mandrel when cooled is provided with inlet and outlet for fluid of any suitable sort and expansion of the mandrel, which is a resilient material on the outside, is had by inhibiting outward flow of fluid so that pressure builds up causing expansion. Cooling is effected when the outlet is opened up allowing fluid to flow through which is channeled around past the resilient material so as to act as a heat transfer medium with the resilient material. For a larger unit, a pair of spaced rollers, with a vacuum trough between them, rotates the unit to be coated past the spraying nozzles. The nozzles themselves are novel in introducing the epoxy powder at the center of the nozzle rather than at the marginal edges, as was commonly done heretofore. The nozzles also are thought to be novel in having deflecting plates therein for controlling the direction of powder discharge from the nozzles onto the parts being coated.

Further novelty resides in the means for controlling the amount of powder being introduced with respect to a given volume of air flow and in incorporating the entire spray structure in controlled flow atmosphere spraying booth. Also novel is the concept of having the spray nozzles mounted on and movable with the retracting door of the booth whereby opening of the booth automatically frees the object to be sprayed for removal and leaves the holding mechanism unobstructed for the insertion of a new object to be sprayed.

This specific physical embodiment of structure is one designed to coat armatures and stators with the epoxy to serve as an insulating barrier between the cores and wires wound thereon. In the past, many different techniques have been employed for the purpose of insulating the slots and armatures and stators such as preforming and inserting of cells, wrapping entire armatures with paper insulation, formed to match the slot after it is pressed into it. These techniques have been used successfully for years. The advent of plastics which can be applied in various nonsolid forms and reduced to solids on the armatures and stators, has held out the promise of more satisfactory insulating techniques than the paper wrappings and cells previously used for this purpose. For example, epoxy resin in the form of a very finely divided powder may be moved by pneumatic techniques and applied to surfaces that have been heated to desired temperature and the powder upon striking the surface melts and forms a homogeneous coating over the heated surface. If the entire surface is to be coated, the problems of applying the powder are relatively simple. Where an intricate structure is to be only partly coated, however, the problems of applying powder on the internal surfaces, for example, while holding the amount of powder applied to the external surfaces to a minimum, preferably zero, become rather severe. It has been known, nevertheless, that if such application could be made, substantial savings in the cost of application and benefits in the form of improved insulation might be achieved.

The principal problem is to prevent the powder from striking surfaces on which it was not desired to make a coating in order that parts between which there was relative motion could have minimum clearance therebetween without danger of striking each other. If the epoxy were applied to surfaces such as these, excess material would have to be machined away which tends to reduce the effectiveness of the bonding and, of course, loses some of the benefit of less expensive application.

Accordingly, it is a principal object of this invention to provide a novel coating machine whereby melting resin powder may be applied to a heated object in a very controlled manner.

It is a further object of this invention to provide such a coating machine which applies resin powder on intricate interior cavities in structures.

Yet another object of this invention is to provide a resin coater in which the entire coating area is enclosed in a controlled flow atmosphere chamber.

Still a further object of this invention is to provide a novel control for the amount of powder applied in a given instance.

Yet another object of this invention is to provide a resin powder coater which by means of special directing nozzles and vacuum hoods excess powder may be withdrawn to control with considerable precision the application of resin powder to objects.

It is a still further object of this invention to provide a resin coating device having an enclosed booth within which a low pressure area can be created.

It is yet another object of this invention to provide a resin powder coating machine having a cabinet and some of the powder depositing and withdrawing structures secured to a movable door for said cabinet whereby they are withdrawn from the coating area when the door is opened.

It is yet another object of this invention to provide a method of coating intricate structures in a controlled manner with respect to the portions of the structures coated.

It is yet another object of this invention to provide a method of insulating stators and armatures wherein the member to be insulated is indescriminately heated but is descriminately coated with a meltable epoxy resin powder which fuses on the stator or armature to form an insulating coating only where desired.

Other and further objects of the invention are those inherent and apparent in the apparatus as described, pictured and claimed.

To the accomplishment of the foregoing and related ends, this invention then comprises the features hereinafter fully described and particularly pointed out in the claims, the following description setting forth in detail certain illustrative embodiments of the invention, these being indicative, however, of but a few of the various ways in which the principles of the invention may be employed.

The invention will be described with reference to the drawings in which corresponding numerals refer to the same parts and in which:

FIGURE 5 is an enlarged fragmentary view of a portion of a structure shown in FIGURE 3 and viewed in the same elevation, portions of the structure are broken away to illustrate internal construction and hidden parts are illustrated in broken lines; FIGURE 5 is drawn to a larger scale than FIGURES 3 and 4;

FIGURE 6 is an enlarged longitudinal section of the powder dispensing nozzle, a portion of which is broken away to conserve space; FIGURE 6 is drawn to a larger scale than FIGURE 5;

FIGURE 7 is a still further enlargement of the structure seen in FIGURE 5 in a still more fragmentary form in which an expanding mandrel is shown in section to illustrate its construction; the scale used is between that used in FIGURES 5 and 6; FIGURE 7 is taken on the line and in the direction of the arrows 7—7 on FIGURE 8;

Figure 1:
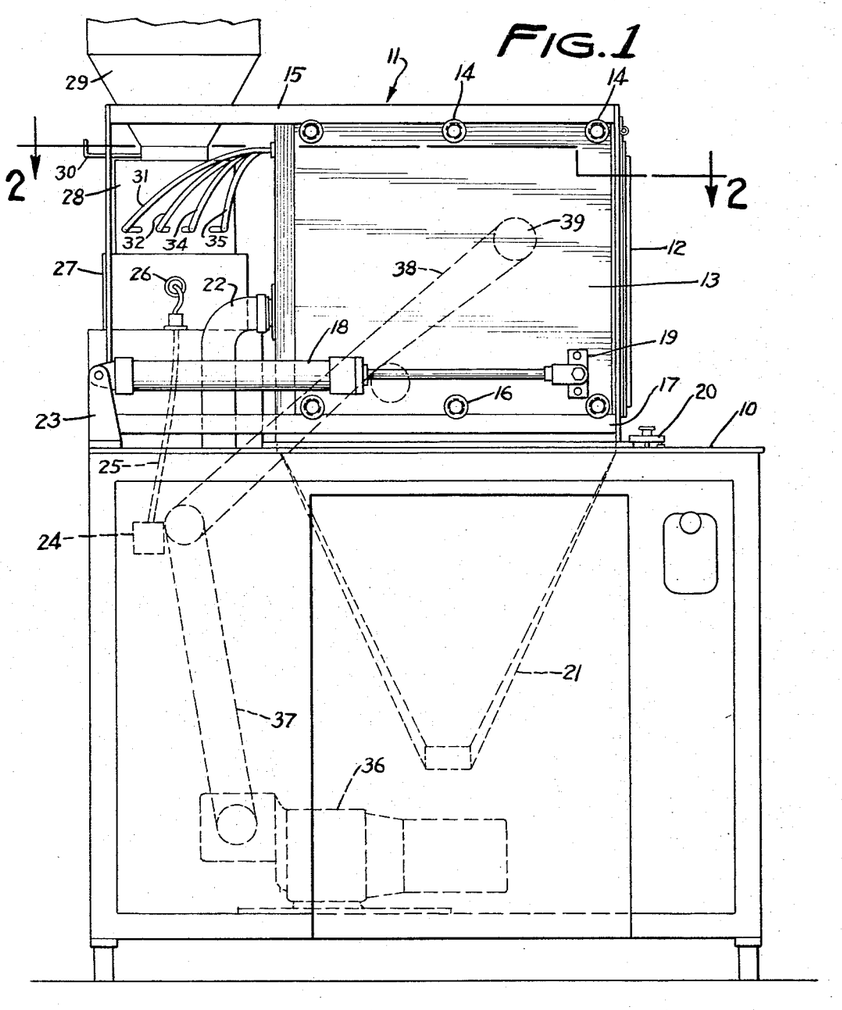
FIGURE 1 is a front elevation of the machine with portions of the resin powder hopper broken away to conserve space, broken lines illustrate hidden parts.

Referring first to FIGURE 1, the table-like frame 10 supports a spray cabinet generally designated 11, which may be provided with an observation window 12. Cabinet 11 is provided with a door 13 which is slidably supported by rollers such as those designated 14 which ride on an upper track 15 and those designated 16 which ride on a lower track 17. The door may be opened manually but it is preferable to employ a power means such as the pneumatic cylinder 18 which is suitably secured to door 13 as shown at 19. Cylinder 18 is a double acting type so that it will both close and open door 13 by sliding it on the tracks 15 and 17.

Figure 4:
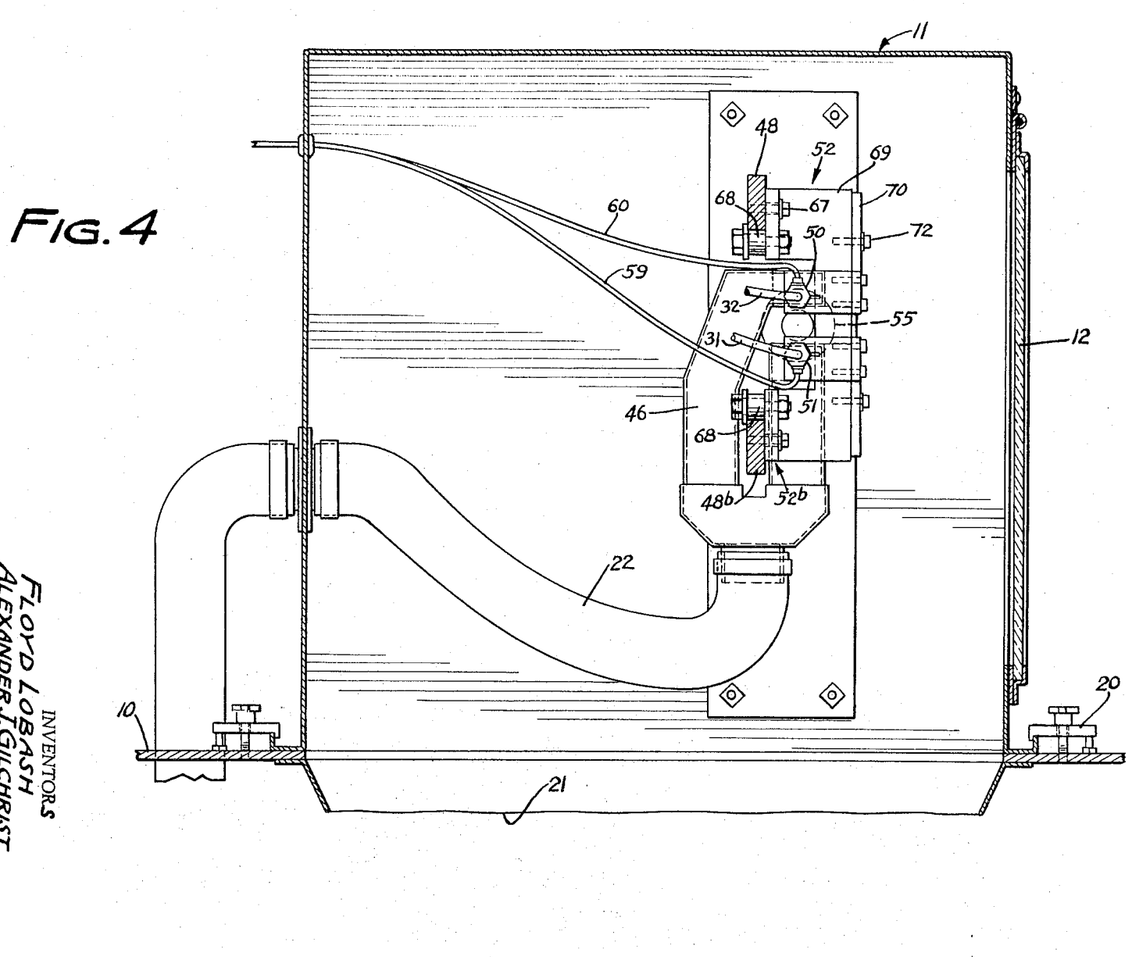
FIGURE 4 is a vertical section taken on the line and in the direction of the arrows 4—4 on FIGURE 3; it is drawn to the same scale as FIGURE 3 and broken lines illustrate hidden parts; portions of the structure are broken away to preserve clarity.

Cabinet 11 may be secured to table 10 in any suitable manner and one such is shown at 20 in the form of a clamp to be described in more detail in connection with the disclosure shown in FIGURE 4. In table 10 is an opening that is not illustrated in FIGURE 1 but which joins an inverted hood set out in broken lines at 21 which is vented to a suitable source of low pressure created by any conventional structure not material to this invention. Also, similarly vented, is the excess powder withdrawing hose 22. Although not shown in this figure, cabinet 11 is vented at the top to allow the entrance of atmospheric air to flow down past the coating area into inverted hood 21.

Air pressure is provided by a conventional compressor and controlled by air pressure regulator 24 in broken lines and which by hose 25 is connected to the air inlet 26 of a so-called fluidizer bed type of powder dispensing device. As far as this invention is concerned, the only novel aspect of this fluidizer is the structure used to control quantities of materials dispensed. However, the device will be described in some detail to lay a foundation for explanation of the control structure.

The portion of the fluidizer 27 into which air pressure is introduced is separated from an upper portion 28 by a ceramic filter having very tiny holes in it. The air filtering through this unit causes the powder to fluff and sort of float in the air. Additional powder may be supplied to portion 28 from hopper 29 under the control of any suitable shutter or gate such as is represented at 30. The fluidizer bed portion 28 is suitably connected by hoses such as those 31, 32, 34 and 35 to dispensing nozzles in the cabinet 11 as will be described later on. The control for powder flow is described in detail in connection with FIGURE 10.

As a most convenient way to apply powder to circular objects is to rotate them past a spray nozzle, a suitable source of rotating power is provided at 36. It is connected by any suitable endless driving means such as those shown at 37 and 38 to a sprocket 39 which may be connected to a supporting arbor for a device being coated. This mechanism, by itself, is noninventive and therefore described and shown in no greater detail herein.

Figure 2:
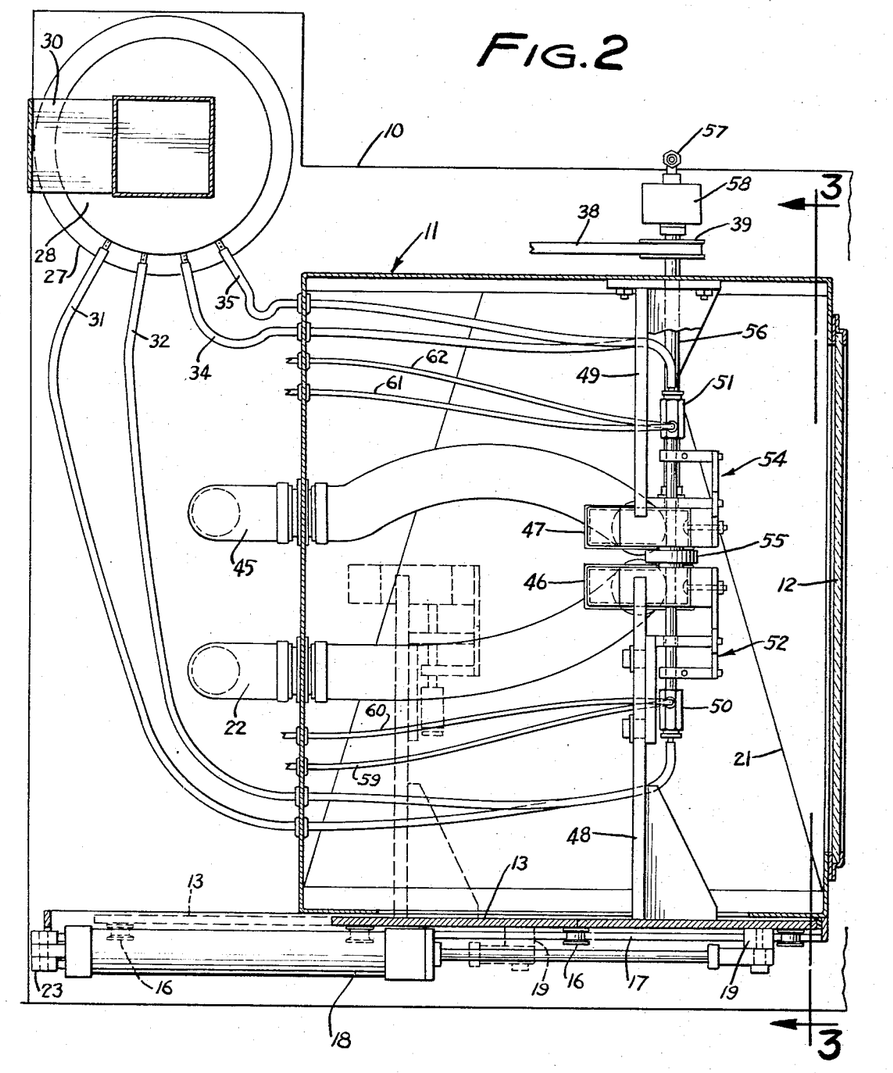
FIGURE 2 is a horizontal section taken on the line and in the direction of the arrows 2—2 of FIGURE 1; it is drawn to a larger scale than FIGURE 1 and the broken lines illustrate hidden parts.

Turning now to FIGURE 2, a second vacuum hose 45 for removing excess powder and substantially identical to hose 22 may be seen, each of these hoses connects to a powder removal hood structure 46 for hose 22 and 47 for hose 45. Box 46 together with its associated nozzle structure, that will be described in detail below, is supported by a suitable bracket as shown at 48 which is secured to door 13. A similar bracket structure 49 is secured to the wall of cabinet 11 that is opposite to door 13.

Each of these bracket assemblies supports one or more nozzle structures, and one is shown at 50 connected to bracket 48 and at 51 connected to bracket 49. Hose or conduit 32 conducts resin powder suspended in air to the rear of nozzle 50, and a similar hose or conduit 35 conducts resin suspended in air to nozzle 51. Similar nozzles are arranged below the two illustrated at 50 and 51 and the hoses 31 and 34 respectively lead to these lower nozzles. The details of the nozzle structure itself will be described in connection with FIGURES 5, 6, 7, 8 and 9.

At 52 with respect to nozzle 50 and at 54 with respect to nozzle 51, and also at excess dust removing hoods 46 and 47 respectively, appear auxiliary bracket structures which literally interconnect the brackets 48 and 49 respectively with the nozzles and hoods. As will be seen in connection with later figures, these subbracket assemblies permit some variation in the orientation of the nozzles and hoods in relation to an object being coated. As shown here, the machine is set up to insulate or coat the inside and end faces of a stator core 55. The stator core is mounted on a mandrel connected to shaft 56 as will be explained in more detail below. The mandrel for the stator is an expanding unit which is operated by fluid pressure and at 57 may be seen a union for a fluid pressure line which is connected through a conventional type rotary joint 58 with drilled passageways in the shaft and hence with the mandrel.

Figure 3:
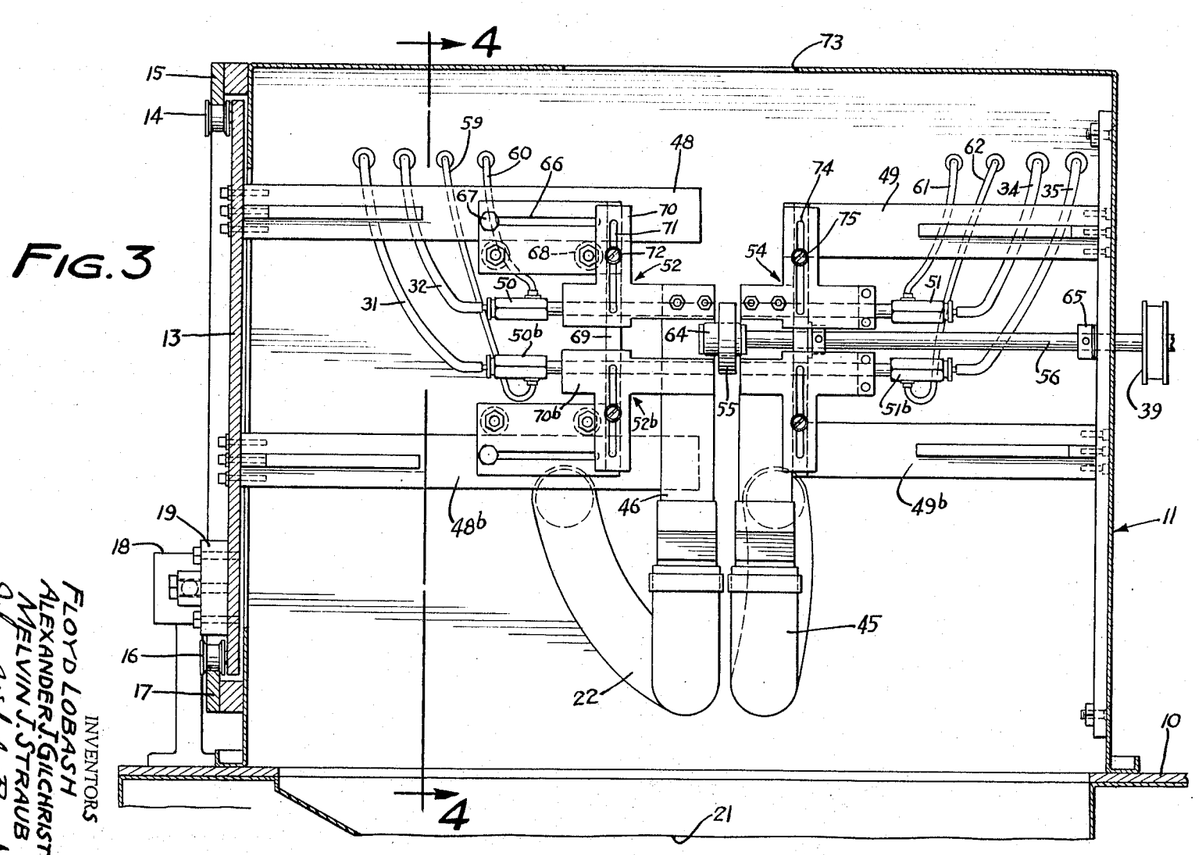
FIGURE 3 is a vertical section taken on the line and in the direction of the arrows 3—3 of FIGURE 2; it is drawn to a larger scale than FIGURE 2 and broken lines illustrate hidden parts.

In FIGURE 3, which is looking at the mechanism as though through window 12, the stator 55 is seen mounted on the mandrel 64. The mandrel is seen clearly to be connected to shaft 56 and this shaft is supported by suitable bearings such as the one shown at 60 for example. The bracket member 48 has a counterpart designated 48b to which the subbracket or auxiliary bracket assemblies designated generally 52b respectively are secured. In order to accommodate the structure to stators of different widths than the one 55 shown in FIGURE 3, the subbracket assemblies 52 and 52b are provided with means for longitudinal adjustment to and from the area in which the stator or other object is coated. A suitable structure for doing this is illustrated in this figure as being slots through which a clamping screw extends in a portion of subbrackets 52 and 52b. Illustratively, the one in 52 is designated 66. A similar slot is provided in similar portion 62b. By loosening cap screws such as the one 67 in slot 66, that portion of the subbracket may be moved longitudinally with respect to bracket 48. In an identical manner, the subassembly 52b may be moved longitudinally likewise. Guide or roller assemblies such as the one designated 68 may be provided to control the attitude of these subbrackets with respect to the brackets 48 and 48b. The two subbracket portions are tied together by the link bar member 69 so that the entire structure is stabilized against movement except to and fro when the cap screws 67 and its counterpart and subassembly 52b are loosened.

Nozzle 50 and the excess powder withdrawal manifold 46 are separately supported on a subbracket of subassembly 52 and for purposes of easy reference, this member is separately identified with the member 70. This subbracket 70 is vertically movable in any suitable manner as by a slot 71 that is engaged by the set screw 72. Loosening the set screw permits vertical adjustment. Additionally, however, set screw 72 permits pivotal adjustment of subbracket 70 about the screw head within the limitations imposed by excess powder manifold box 46. In other words, the nozzle may not be pivoted enough so that the box would strike either the mandrel 64 or a stator such as the one 55 mounted on it, but it may be tipped at least slightly to aid in directing the powder to surfaces that might otherwise be difficult or impossible to get covered. Identical structure 70b is provided for the lower nozzle 50b. Subassembly 70b may also be pivoted and hence provide either supplemental direction of powder to the same surface for which purpose the subbracket member 70 has been tilted or in the opposite direction in order to coat a different surface.

While the structure of the excess powder removing hoods has been disclosed and described as an integral part of the structure, it has been found that it is not essential in all applications, at least. Under circumstances of relatively easy application and when care is exercised as to the amount of powdered resin applied, the hoods 46 and 47 may be omitted safely.

Air hoses 59, 60, 61 and 62 may be seen near the powder hoses 31, 32, 34 and 35. These air hoses are supplied with controlled air pressure adequate to produce the desired flow of air supported resin powder at from 10 to 25 pounds per square inch, as will be described in connection with FIGURE 6 particularly.

Subbracket assembly 54 is provided with vertical, and tilting adjustment by slots such as the one designated 74 engaged by set screws 75. Nozzle 51b is seen to be provided with similar structure. The reason for limiting movement of this structure to vertical and tilting adjustment is that the shaft 56 necessarily limits the location of the righthand side, as viewed in FIGURE 3, of mandrel or collet for supporting the units to be coated and hence need not be moved longitudinally or axially with respect to shaft 56.

In FIGURE 3, an opening 73 is seen in the top of cabinet 11. Atmospheric air enters the cabinet through this opening and flows into all low pressure areas. Thus the pressure inside cabinet 11 is just slightly below atmospheric.

Also seen in this view are the guide rollers for the subbracket assemblies 52 and 52b which are clearly apparent engaging the underside of bracket 48 and the topside of bracket 48b. Also clearly visible in this view is the dual character of manifold hood 46 for withdrawing excess powder. Stator 55 appears only in broken lines as it would be substantially hidden by the structure of the nozzles and excess powder removing manifold.

Figure 5:
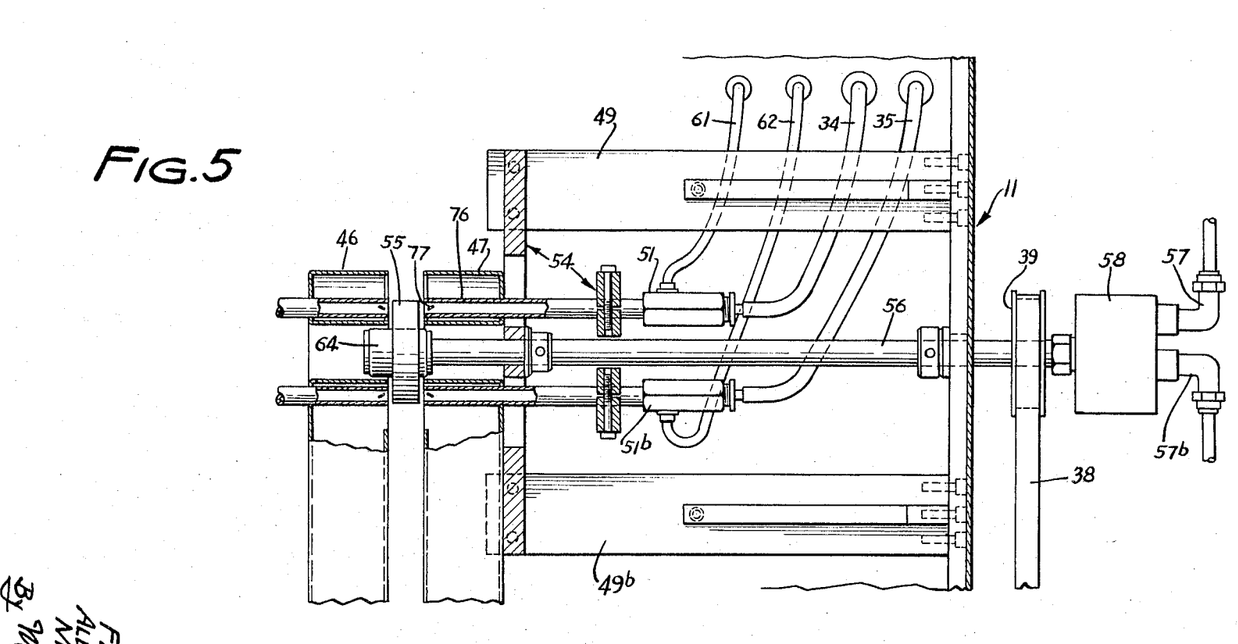

FIGURE 5 discloses how the nozzles extend through the excess powder removal hoods so that the low pressure area generated in these hoods completely surrounds the nozzle and tends to withdraw any powder that is not fairly immediately deposited on the article being coated such as stator 55.

The nozzle tubes, as can be seen in nozzle tube 76 of nozzle 51, may be provided with a deflection plate 77. As will be discussed in more detail in connection with FIGURES 7 and 8, this deflection plate is sometimes affixed and sometimes adjustable. The purpose of this deflector plate is of course to direct the powder on the surfaces of an object being coated that otherwise would be uncoated or insufficiently coated.

At the right of the drawing, the rotary joint 58 and the fluid connector 57 are shown clearly. In this figure also appears the secondary fluid connection 57b which may be used in some instances.

Figure 6:
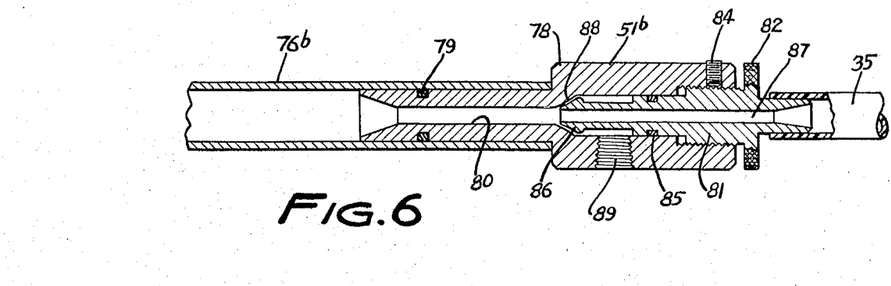

In FIGURE 6 is shown a detail section of a nozzle such as the one 51b for example. In that view, there is seen the main nozzle body 78 on which the nozzle tubes 76b is secured movably. A suitable seal as at 79 may be used to assure that there will be no leakage between the end portion of nozzle body 78 and tube 76b as long as tube 76b engages and surrounds the seal. Within nozzle body 78 is a passageway 80 which varies in diameter from its end at the righthand side of the drawing to its inner end within the tube 76b. An adjustable jet member 81 is suitably secured within nozzle body 78 so as to be adjustable with respect thereto and in this case suitable means are shown illustratively as threads with the knurled knob 82 for turning jet 81 into and out of body 78. A set screw 84 may be provided to lock the jet in a particular desired location. At 85 is shown a seal similar to the one 79 and in this case, causing a sliding substantially air-tight seal between body 78 and jet member 81. Jet member 81 has a head 86 formed thereon and a bored passageway 87 extending through it lengthwise. The channel 80 is substantially larger in the area into which jet member 81 enters and there is a shoulder at 88 toward which the head 86 is screwed as the knurled knob 82 is turned so as to thread member 81 into body 78.

At 89 is the connection for an air tube 62 (not shown). As air is applied to this tube and through the wall of nozzle body 78, it is sealed against the flow to the right and hence it flows to the left and past the shoulder 88. As the air is forced to flow at considerably increased rate past head 86 where it is restricted by the shoulder 88, a low pressure area is created. Into this low pressure area the epoxy powder, air borne from the fluidizer bed, is projected and into the air stream flowing from air tube 82 into the nozzle. These two fluid streams join each other carrying the powder out nozzle tube 76.

In previous nozzles for use for this purpose, the epoxy powder was introduced more or less as the air is introduced in this nozzle and the air stream is applied through a central passageway. While such nozzles will function, they exhibit a tendency to build up a coating of resin at the inside circumference of the nozzle and require considerable attention to keep them functioning in a most desirable manner. In the nozzle of this invention, the air stream flowing around the outside of the head through which the powder is introduced, constantly insulates the powder from the walls of the nozzle and hence building up of the powder is avoided or minimized.

Figure 7:
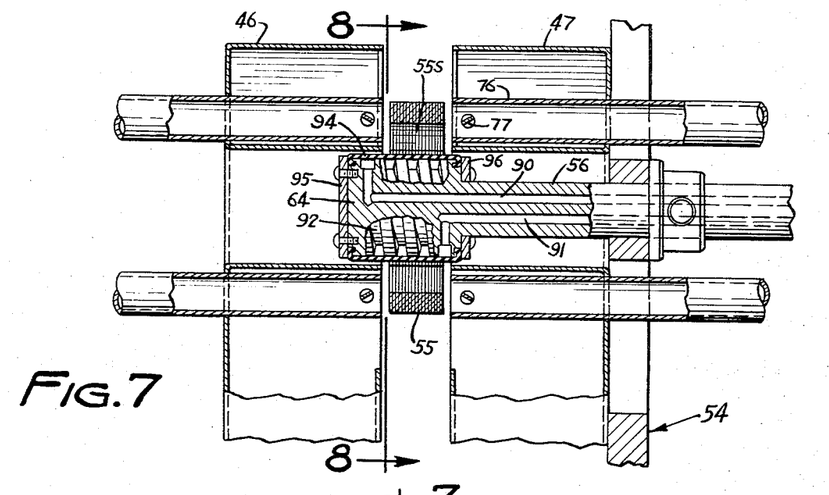

In FIGURE 7, tube 76 is shown in sufficient size that the deflector plate 77 can be seen to be a cylindrical member that is flattened in the center. This member extends through round holes in the tube 76 and hence can be rotated so as to change deflecting action. All the other nozzles will be seen to have similar deflecting plates.

In FIGURE 7, also, the stator element is drawn in a little more detail and discloses the stator slots 55s. In this view also shaft 56 is seen to have a pair of bored passageways 90 and 91. These passageways connect to rotary connector 58 with fluid connectors 57 and 57b respectively. These passageways communicate with the interior of a mandrel member 64. One of them communicates with one end and the other with the other end of a spiral channel 92 formed in the outer surface of the inner portion of the mandrel. A resilient sleeve 94 is suitably clamped in a fluid-tight relationship to the mandrel head as by the plate 95 and the collar 96. Thus an expanding mandrel is formed which may also serve to cool the resilient surface of the mandrel. This is sometimes necessary when relatively high speed production is being carried out since the stators 55 must be heated to a relatively high temperature before the resin powder is applied thereto in order to melt the powder and form the desired insulating coating. Since the resilient material in the mandrel will not withstand continued high temperatures without damage, it is essential that it be possible to cool this unit under these circumstances. This cooling is achieved in the following manner.

Fluid which is both a cooling medium and a pressure medium is introduced through one of the fluid connections such as 57. It flows into the mandrel and circulates around on the inside of the resilient sleeve 94 thus cooling it. When a stator is placed on the mandrel, and it is desired to expand it in order to grip the stator, the connection 57b which heretofore has been freely exhausting fluid applied through connector 57 is shut off or the flow at least retarded. Under either circumstance a pressure increase is achieved within the mandrel head 64 and resilient sleeve 94 expands in response to the increased pressure. Expansion need not be very great of course but just enough to lightly grip the stator for the dual purpose of rotating it past the nozzles and also to mask or cover the internal surfaces of stator 55 to avoid depositing the powder and hence the insulating coating on those surfaces. Devices such as stator 55 are used in electrical machines wherein a rotary member is mounted between the pole pieces formed by the inside portions of slots 55. These pole pieces are desirably kept as close to the rotating member as possible, either to produce interaction between the conductors therein and the magnetic field generated by the windings on the pole pieces to produce rotation as in a motor, or alternatively to induce the highest possible voltages as in the case of the generator. The mechanism for controlling flow being exhausted through port 57b is conventional in nature and hence neither shown nor described.

Figures 8, 9:
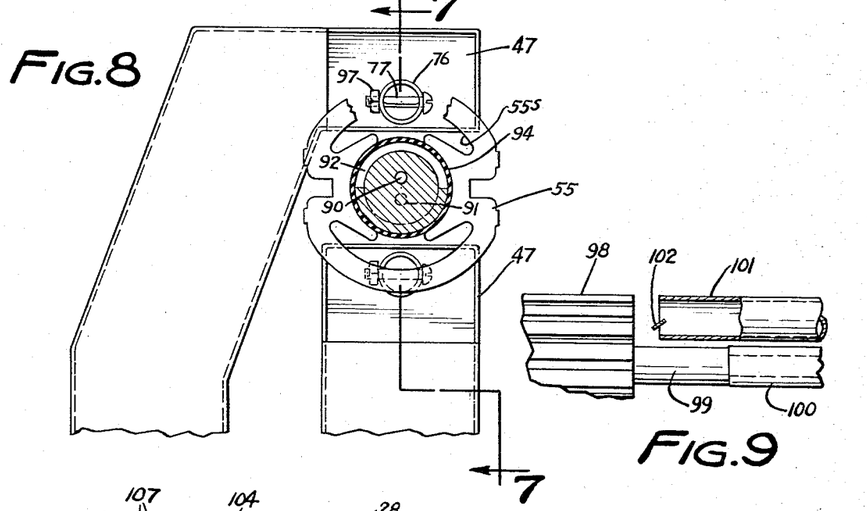
FIGURE 8 is a vertical section taken on the lines and in the direction of the arrows 8—8 of FIGURE 7; it is drawn to the same scale as FIGURE 7 and broken lines illustrate hidden parts.
FIGURE 9 is a fragmentary view of a nozzle and a portion of an armature core illustrating the modification of the nozzle necessary when coating armatures as distinguished from stators; it is drawn to the same scale as FIGURES 7 and 8 with broken lines illustrating hidden parts.

In FIGURE 8, the manner in which the resilient sleeve 94 serves to mask the inside of stator 55 is clearly shown. This masking of the stator together with the functioning of the vacuum or low pressure excess powder withdrawal manifold or hood 47 will substantially prevent any powder from being deposited on the interior surfaces of the pole pieces of stator core 55.

Also, in this view, the character of deflecting plates 77 as being constructed from a bolt, the center of which has been flattened to form the deflection plate, is clearly visible. Thus, the deflection plate can be pivoted to any desired angle and then held in that position by tightening nut 97. By use of this structure powder tends to be deflected either down or up depending on the adjustment given to the plate.

In FIGURE 9, are shown: a fragment of an armature 98, its shaft 99, held in a collet 100, which is mounted in place of the arbor 64. A nozzle tube 101 is provided with a deflector plate 102 which will direct insulating material on to shaft 99, adjacent to the core 98 of the armature. It is to be noted in this connection that the deflector nozzle 102 is substantially fixed and is in the lower half of the nozzle tube 101. This is in contrast to the arrangement of the deflector plates such as the one 77. It has been discovered that there is less need to be able to adjust the angle of deflector plate 102 than in the case with the deflector plates 77 and hence this deflector plate is more or less fixed in attitude. This attitude can be varied somewhat by merely bending but obviously adjustment of this nature is limited. Otherwise, the structure as used to coat armatures, as distinct from stators, is identical to that shown and described heretofore.

Figure 10:
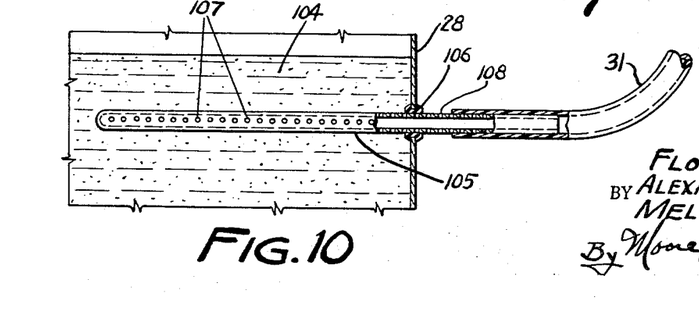
FIGURE 10 is a fragmentary vertical section through a portion of the epoxy reservoir and metering control means wtih broken lines illustrating hidden parts; the scale used in this figure is larger than that in FIGURE 5 but smaller than that used in FIGURES 7 and 8; the scale used in this figure is that used in FIGURES 7, 8 and 9.

In FIGURE 10 a detail of the means for controlling the amount of material drawn from the supply of powdered resin (in this case epoxy) is disclosed. In that view, a fragment of the wall of the reservoir 28 is shown in which there is a supply of epoxy powder 104. Air admitted to the reservoir 103 through a ceramic filter in the bottom causes the powder to float or be carried by the air so that it might be likened to a colloidal suspension. Tube 105 extends through the wall compartment 28 via any suitable means for maintaining a substantially air-tight seal such as grommet 106. Tube 105 is provided with a series of openings 107, at least some of which as at 108, are on the outside of container 28 with respect to grommet 106. Hose 31 may be extended up until it contacts grommet 106 and hence covers all of the openings 108, or it may be withdrawn to expose one or more of these openings. By this means, the amount of powder that is withdrawn from the supply 104 of resin may be controlled. The pressure differential applied to hose 31 tending to draw air and with it the supported resin into the nozzle remains substantially constant. Likewise, the air being introduced to the fluidizer bed which tends to float and support the powder particles is constant and hence by varying the amount of air that is bled into the system from the surrounding atmosphere through the holes 108, the quantity of resin for any given time interval, that is carried through tube 31 to its nozzle, may be controlled. This powder control system is employed with all the other hoses that lead to the other nozzles.

Figure 11:
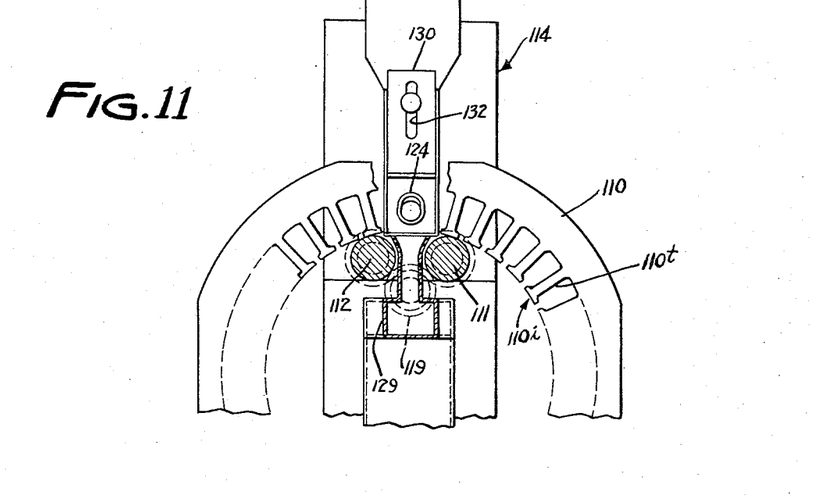
FIGURE 11 is a view smaller than that shown in FIGURE 8 illustrating a modified form of stator rotating structure with broken lines illustrating hidden parts; the scale used is smaller than that used in FIGURES 7, 8 and 9 but larger than that of FIGURE 5 and portions of the stator are broken away to reveal the construction of the nozzle; this view is taken on the line and in the direction of the arrows 11—11 of FIGURE 12.

In FIGURE 11, a different form of rotating structure and hence a different form of manifold for withdrawing excess powder is illustrated. This structure is designed to handle stators of relatively large size, stators larger than can be conveniently gripped and rotated by a center mandrel. In this view, the stator 110 has a fairly substantial inside diameter and is, accordingly, of substantial weight. A pair of rollers as shown at 111 and 112 are suitably and rotatably supported in the housing wall 114 in any suitable manner, the precise character of which is not material to the invention. Associated with the support 114 is the slidable element 115 associated with a second slidable element 116 interacting with the units 117 and 118. Opentings are provided extending vertically in all of these units.

Rollers 111 and 112 are each provided with a suitable gear, represented by the broken line circle surrounding the rollers themselves, which mesh with a driving gear shown by the broken lines below them and designated 119. Gear 119 is mounted on a suitably journalled shaft 120. Any appropriate driving means such as the circular means 121 and the endless driving means 122 is connected to the shaft 120 and an source of power for rotating gear 119. As it rotates, of course, the two rollers 111 and 112 are driven in the same direction. Stator 110 resting on them rotates simultaneously past the nozzles 124 and 125.

Figure 12:
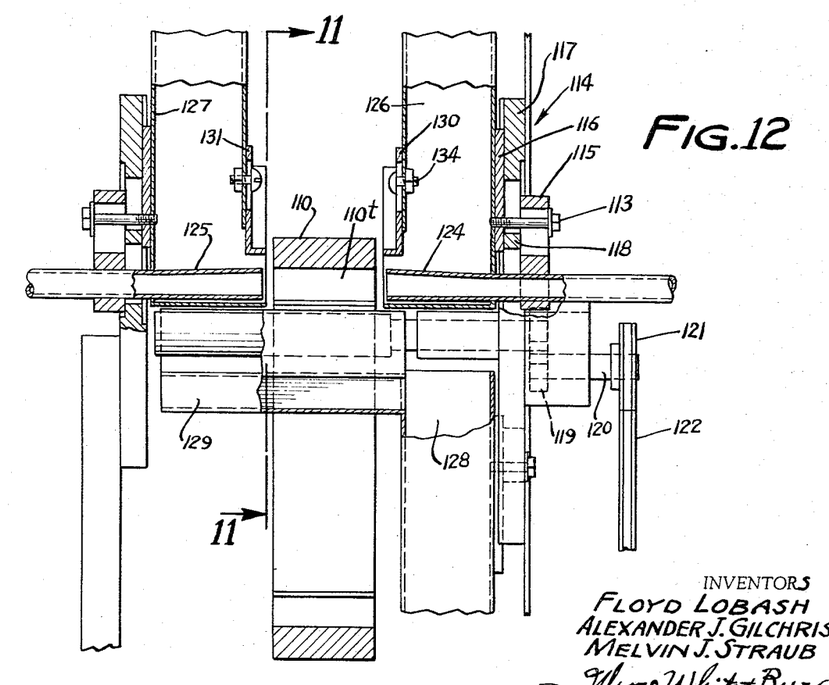
FIGURE 12 is a view similar to FIGURE 7 but with respect to the structure shown in FIGURE 11 with portions shown in vertical section and other parts broken away to illustrate internal construction; the scale used is that of FIGURE 11; broken lines illustrate hidden parts.

The nozzles of course are surrounded by low pressure excess powder hoods 126 and 127 respectively. The nozzles also are flared at their outer ends as can be seen most clearly perhaps in FIGURE 12 but also represented in FIGURE 11 in an out-of-round nature or character of the front of the nozzle tube 124 as shown therein.

The lower excess powder manifold 128 has a trough-like extension 129 that extends between the rollers and flares at its top between them so as to draw substantially all powder from between the rollers that has not been deposited from any portion of a stator thereby prevents resin from being deposited to the inner surfaces 110*i* of the teeth 110*t* of stator 110. Frictional engagement of rollers 111 and 112 at the inside portions of 110*i* of stator 110 is adequate to rotate it past the nozzle tubes 124 and 125. The openings around the tubes 124 and 125 within the hoods 126 and 127 are controlled to some extent by the shutters 130 and 131 which are made vertically adjustable by means of a simple slot as seen most clearly at 132 in FIGURE 11 for the shutter 130 and a simple clamping means such as a nut and bolt assembly 134 securing the shutter in an adjusted position. The shutter arrangement has been found very effective in preventing the resin from getting on the outside periphery of the stator 110, as it is being coated.

Operation

The operation of the device is controlled by any suitable sequential timer properly associated with conventional auxiliary controls of various types which are, therefore, not disclosed or described in detail.

The object to be coated, of course, is first preheated n any suitable manner as in an oven, for example. When the objects to be coated are nearly hot enough to coat, the coating device is turned on to build up air pressure, get the resin powder in suspension, and create a low pressure source for the hoods. With door 13 open and hence bracket assembly 48–48*b* and its associated nozzle structure withdrawn from the coating area, the heated object is appropriately supported in front of the nozzles 51 and 51*b* as on a mandrel or in a collet. A conventional sequence control device is used and hence no disclosure is made of that unit specifically. As soon as the object is mounted in front of nozzles 51 and 51*b*, the sequence starting control is actuated which causes immediately the closing of door 13 and the carrying with it of the nozzles 50 and 50*b* into position opposite the object to be coated. Bracket and subbracket 48 and 48*b* are preadjusted with regard to brackets 49 and 49*b* for the particular object being coated. The sequence control then opens appropriate valves which apply controlled air pressure to lines 59–62. The flow of air through these lines and their respective nozzles produces a low pressure area into which the "fluidized" or suspended in air resin powder is carried as the result of comparatively higher pressures at the fluidizing bed unit 28. After a very slight time delay, perhaps on the order of ½ a second, appropriate controls are actuated by the sequence timer to initiate movement of the surfaces to be coated past the nozzles, in this case by rotation of shaft 56 in FIGURES 3 and 5, for example, and shaft 120 in FIGURE 12. Thus spraying commences slightly before movement occurs to assure good coverage of the resin and after sufficient rotation to cause every portion of the object to pass a spraying nozzle, the sequence timer stops rotation of the shaft carrying the object and simultaneously air pressure to the nozzle tubes 59–62. Thereafter, the cabinet door 13 is opened and the coated object may be removed.

In the sequence of operation, where the expanding mandrel is used, the exhaust side of the circuit through the expanding and cooled mandrel is at least partially blocked as a first step in operation in order to raise pressure inside the mandrel and so expand it. When pressure is applied to a single line expanding mandrel, of course, the same result is achieved as far as gripping the object is concerned. By the time the door closes the mandrel is gripping a stator to be coated. In the case of an armature, the collet is a simple frictional grip since the load involved in very slight. When the hoods 46 and 47 are not used, air flows in through port 73 in the top of cabinet 11 to the low pressure area connected to inverted hood 21. This produces a generally directed downward air flow past the coating zone and carries any resin powder floating freely away from the coating zone.

It is apparent that many modifications and variations of this invention as hereinbefore set forth may be made without departing from the spirit and scope thereof. The specific embodiments described are given by way of example only and the invention is limited only by the terms of the appended claims.

What is claimed:

1. A spray coating machine comprising: a cabinet, spray nozzles mounted within said cabinet, a door movably mounted on the cabinet closing one side of said cabinet, additional spray nozzles secured to said door, means to adjust the positions of said spray nozzles secured to said door to and from the nozzles mounted inside said cabinet independently of door movement, means for supporting movably an object to be coated in the center of all of said nozzles, each of said nozzles having a discharge outlet and a restricted passage open to the discharge outlet, said passage having a periphery and a center means for applying air under pressure to said nozzles, means for applying resin powder carried in an air stream to said nozzles, the air stream carrying said powder being different from the air stream carrying the air under pressure applied to said nozzles, said air under pressure applied to said nozzles being applied at the periphery of said restricted passage and the air carrying resin powder being applied at the center of said restricted passage and means for withdrawing excess resin powder from the area surrounding the means for supporting an object and between the nozzles.

2. The spray coating machine of claim 1 in which said means for withdrawing excess resin powder comprises an inverted hood at the bottom of said cabinet communicating with said cabinet, said inverted hood adapted to be connected to a pressure less than atmospheric, and a vent in the top of said cabinet for the admission of atmospheric air through the top thereof.

3. The spray coating machine of claim 1 in which said means for removing excess resin powder comprise hoods surrounding said nozzles and conduit communicating with said hoods and adapted to be in communication with an area of a pressure less than atmospheric.

4. The spray coating machine of claim 1 in which said means for supporting movably an object to be coated comprises, a shaft rotatably mounted in the wall of said cabinet and having internal passages therein running its length, a mandrel having internal passages therein communicating with the passages in said shaft and fixed to said shaft, the internal passages in said mandrel being in part open toward the outward surface of said mandrel, a cover of elastic material surrounding said mandrel, said elastic material secured to said mandrel beyond said open passages at both ends thereof in a fluid-tight relationship, supply conduits for fluid flowing to and from said passages in said shaft and a rotary joint interconnecting said supply conduits and said rotatable shaft.

5. The spray coating machine of claim 4 in which said open passages extend spirally the length of that portion of the mandrel covered by said elastic cover.

6. The coating machine of claim 1 in which said means for supporting movably an object comprises: a shaft rotatably mounted in the wall of said cabinet, a mandrel secured to the end of said shaft, at least part of said mandrel comprising a resilient member, means associated with said mandrel for applying pressure to said resilient member as to cause it to expand in diameter.

7. The spray coating machine of claim 1 in which each of said nozzles comprise, a hollow nozzle body having a discharge outlet and a restricted passage open to the discharge outlet, a nozzle jet tube longitudinally movable in said body providing a passage for resin powder carried in an air stream, a shoulder in said body surrounding said restricted passage, a head on said nozzle jet tube too large to pass said shoulder and means for adjusting said nozzle jet tube into and out of said nozzle body whereby said head approaches and can be withdrawn from said shoulder providing a passage for the air under pressure to said restricted passage.

8. The spray coating machine of claim 1 in which each of said nozzles have a spray directing tube aligned with the discharge outlet and a deflecting vane secured rotatably in the end of said spray directing tube.

9. The spray coating machine of claim 1 in which said means for supporting movably an object comprises a rotating shaft, a collet secured to said shaft and deflecting vanes secured to said nozzles and deflecting a portion of the air spraying resin powder toward the axis of rotation of said collet.

10. The spray coating machine of claim 1 wherein said means for supporting movably an object comprises: a pair of driven rollers at either side and below said nozzles.

11. A spray coating machine comprising: a cabinet, first spray nozzles mounted in said cabinet, a door movably mounted on the cabinet closing one side of said cabinet, second spray nozzles secured to said door, means for supporting movably an object to be coated in the center of all of said nozzles when said door is in a closed position, each of said nozzles having a discharge outlet and a restricted passage open to the discharge outlet, said passage having a periphery and a center, means for applying air under pressure to said nozzles, means for applying resin powder carried in an air stream to said nozzles, the air stream carrying said powder being different from the air stream carrying the air under pressure applied to said nozzles, air under pressure applied to said nozzles being applied at the periphery of said restricted passage and the air carrying resin powder being applied at the center of said restricted passage and means for withdrawing excess resin powder from the area surrounding the means for supporting an object and between the nozzles.

12. The spray coating machine of claim 11 including means to adjust the positions of said second spray nozzles to and from said first spray nozzles independently of door movement.

13. The spray coating machine of claim 11 in which said means for supporting movably an object comprises: a shaft rotatably mounted in the wall of said cabinet, a mandrel secured to the end of said shaft, at least part of said mandrel comprising a resilient member, means associated with said mandrel for applying pressure to said resilient member to cause it to expand in diameter.

14. The spray coating machine of claim 11 wherein said means for supporting movably an object comprises: a pair of driven rollers on either side and below said nozzles.

15. The spray coating machine of claim 11 wherein the means for applying resin powder carried in an air stream includes a tube spaced from and open to the inlet of the restricted passage so as to discharge the resin powder in the center of the restricted passage.

References Cited

UNITED STATES PATENTS

| | | | |
|---|---|---|---|
| 992,144 | 5/1911 | Babcock | 302—25 |
| 2,083,851 | 6/1937 | Marcy | 239—433 X |
| 2,336,946 | 12/1943 | Marden et al. | |
| 2,355,382 | 8/1944 | Leguillon | 118—318 X |
| 2,358,651 | 9/1944 | McGowan | 118—321 X |
| 2,504,805 | 4/1950 | Clipson | 239—433 X |
| 2,642,033 | 6/1953 | Miller | 118—308 |
| 2,689,801 | 9/1954 | D'Alelio | 118—308 |
| 2,712,826 | 7/1955 | Schleyer et al. | 134—139 |
| 2,758,564 | 8/1956 | Randall | 118—309 |
| 2,770,212 | 11/1956 | Marantz | 118—312 X |
| 2,850,025 | 9/1958 | Bond | 134—200 X |
| 2,953,483 | 9/1960 | Torok | 118—48 X |
| 3,100,724 | 8/1963 | Rocheville | 118—308 |
| 3,185,131 | 5/1965 | Manning | 117—18 X |
| 3,247,004 | 4/1966 | Dosser | 117—18 |
| 3,291,630 | 12/1966 | Deyle et al. | 117—21 X |
| 3,291,631 | 12/1966 | Smith | 117—18 X |

CHARLES A. WILLMUTH, *Primary Examiner.*

J. P. McINTOSH, *Assistant Examiner.*